United States Patent [19]

Goldmann et al.

[11] Patent Number: 5,002,712
[45] Date of Patent: Mar. 26, 1991

[54] MANUFACTURING COMPOSITE MATERIALS

[75] Inventors: Gerd Goldmann, Krefeld; Wolfgang Lindner, Dormagen, both of Fed. Rep. of Germany

[73] Assignee: Bayer Aktiengesellschaft, Leverkusen-Bayerwerk, Fed. Rep. of Germany

[21] Appl. No.: 420,015

[22] Filed: Oct. 11, 1989

[30] Foreign Application Priority Data

Oct. 19, 1988 [DE] Fed. Rep. of Germany ....... 3835575

[51] Int. Cl.$^5$ .............................................. B29C 47/02
[52] U.S. Cl. .................................... 264/174; 264/136; 264/257; 425/505; 425/509; 425/516; 425/113; 427/358; 427/412; 427/434.6; 427/434.7
[58] Field of Search ............... 264/174, 136, 135, 257; 425/113, 445, 116, 505, 509, 515, 516, 112; 427/412, 358, 434.6, 434.7

[56] References Cited

U.S. PATENT DOCUMENTS

| | | | |
|---|---|---|---|
| 3,301,932 | 1/1967 | Chisholm | 264/174 |
| 3,529,050 | 9/1970 | Smith | 264/137 |
| 3,568,640 | 3/1971 | Kuettner | 425/376.1 |
| 3,933,726 | 11/1976 | Moyer | 264/174 |
| 4,122,145 | 10/1978 | Hartmann | 264/174 |
| 4,312,917 | 1/1982 | Hawley | 264/174 |
| 4,588,538 | 5/1986 | Chung et al. | 264/136 |
| 4,778,367 | 10/1988 | Hilakos | 264/174 |
| 4,864,964 | 9/1989 | Hilakos | 264/174 |
| 4,883,625 | 11/1989 | Glemet et al. | 264/136 |

FOREIGN PATENT DOCUMENTS

| | | |
|---|---|---|
| 0035974 | 3/1981 | European Pat. Off. . |
| 0056703 | 7/1982 | European Pat. Off. . |
| 0117098 | 8/1984 | European Pat. Off. . |

*Primary Examiner*—Jeffery Thurlow

[57] ABSTRACT

Process for the manufacture of continuous moulded bodies from structures of reinforcing fibres impregnated with thermoplastic plastics, wherein a structure of reinforcing fibres is passed through a melt of the thermoplastic at a pressure of 1 to 800 bar for a length of at least 300 mm and a device for carrying out the process.

10 Claims, 3 Drawing Sheets

MANUFACTURING COMPOSITE MATERIALS

BACKGROUND OF THE INVENTION

Continuous processes for the manufacture of composite materials, such as continuous profiles, tapes and flat structures in which continuous fibres, for example glass fibre rovings, carbon fibre rovings or aramide fibre rovings, are drawn through a melt of a thermoplastic plastic, are known.

Hence, a process is described in European Application 0 056 703 in which reinforcing fibre rovings are drawn through a melt of a thermoplastic plastic, into which at least one heated surface is immersed to spread the roving. The materials thus manufactured should have longitudinal bending moduli of at least 70%, preferably at least 90%, of the theoretical value.

In practice, several spreading devices are always required. However, the take-off forces to be applied increase sharply with the number of spreading devices (where cylindrical spreading devices are used with an increasing total looping angle), with the viscosity of the melt and with the take-off rate. As large take-off forces damage the reinforcing fibres and hence diminish the properties of the composite material, the available "working range" is very small. In addition, the quality of impregnation and hence also the quality of the products (in the bending test) decrease with increasing viscosity of the melt and increasing take-off rates. The process of European Application 0 056 703 therefore only produces good results at melt viscosities up to 30 Pas and at low take-off rates (below 0.3 metres/minute). Thus, in the case of most thermoplastic materials, those which are of major interest, namely the high molecular types, cannot be used and in addition, only uneconomically low processing rates are possible.

Although the use of rotating surfaces for spreading the rovings reduces the take-off forces, any broken fibres generally contained in the rovings, adhere to the rotating parts and accumulate thereon so that the impregnating process comes to a standstill after a short time.

It is also not possible to avoid the difficulties mentioned by using a further, similarly known process, in which the molten thermoplastic is introduced directly into a gap between the reinforcing fibre roving and the spreading surface.

In addition, processes are known which operate with transverse spraying heads. Such processes have been widely used for a long time in cable coating. In these processes, thermoplastic material is applied from a melt extruder to a reinforcing fibre strand which is usually moved vertically to the direction of the melt. Processes of this kind which in some cases use specially modified tools are described in U.S. Pat. No. 3,993,726, U.S. Pat. No. 4,588,538, European Patent 0 035 974 and European Patent 0 117 098.

In transverse spraying heads of this type, increased pressure usually occurs over a short section of the reinforcing fibre strand as a result of the conveying pressure of the extruder. Accordingly, this increased pressure only acts on the reinforcing fibre strand for a short period. In the state of the art, the significance of pressure therefore receives varied evaluation: whereas U.S. Pat. No. 3,993,726 refers to the requirement of "high pressure," U.S. Pat. No. 4,588,538 only uses the term "under pressure," whereas European Application 0 035 974 makes no mention at all of a conveying effect of the pressure in the transverse spraying head.

BRIEF SUMMARY OF THE INVENTION

It has been found that continuous, highly solid profiles, tapes and thin, flat structures of composite materials with a thermoplastic as a matrix, and continuous reinforcing fibres can be manufactured, if the reinforcing fibres are passed through a melt of the thermoplastic plastic at an increased pressure for a relatively long, prescribed distance. In this mode of operation, it is not necessary to spread the fibres in the bath. Spreading devices and appropriate inserts are therefore not required.

The object of the invention is therefore a process for manufacturing continuous moulded bodies from structures of reinforcing fibres impregnated with thermoplastic plastics, which is characterized in that a structure of reinforcing fibres is passed through a melt of the thermoplastic plastic at a pressure of 1 to 800 bar for a length of at least 300 mm.

BRIEF DESCRIPTION OF THE DRAWINGS

FIG. 2 depicts schematically the pressure profile along the device.

DETAILED DESCRIPTION OF THE PREFERRED EMBODIMENTS

Figure 1:
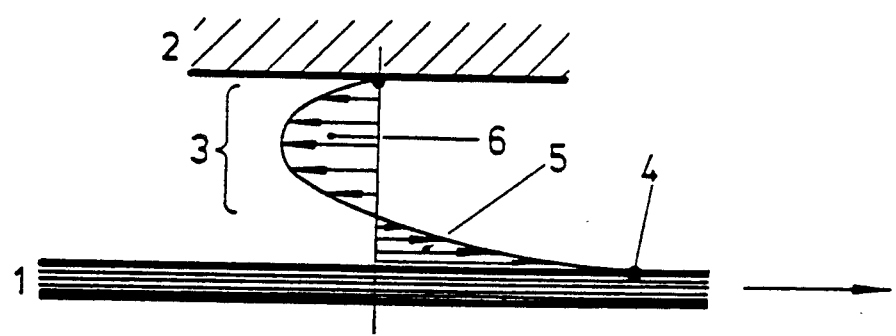
FIG. 1 shows the profile of the flow of thermoplastic melt in a gap between a solid wall and a moving tape.

In this process, the take-off forces remain low so that the reinforcing fibres are treated with care. High take-off rates are achieved. The impregnating bath can be very long due to the absence of inserts so that an adequate residence time and thus adequate impregnating quality and good mechanical properties are achieved even at high take-off rates. The excess pressure of 1 to 800 bar, preferably 10 to 200 bar, prevailing in the impregnating bath for a length of at least 300 mm ensures all-round fibre-protecting impregnation. The conditions to be used as regards pressure and length depend on the titre and structure of the reinforcing fibre structure to be impregnated which is specified in more detail below. It is immediately clear that a thin, non-twisted fibre roving can be impregnated at lower pressure and/or over a shorter length of the pressure zone than, for example a heavy reinforcing fibre fabric.

In accordance with the invention, it is also possible to process thermoplastic plastics having high melt viscosities. Thus, in principle, all thermoplastic plastics can be used. However, those having melt viscosities below 500 Pas, particularly those having melt viscosities below 200 Pas, at the processing temperature are preferred.

It is essential that the thermoplastic has a lower softening interval or melting point than the material of which the reinforcing fibres are made. Suitable thermoplastics are thermoplastic materials in the widest sense, that is materials which behave reversibly or intermediately as thermoplastics, such as for example thermoplastic plastics or intermediate thermoplastic phases of duromers. Examples of thermoplastics are polyolefins, vinyl polymers such as polyvinylhalides, polyvinylesters, polyvinylethers, polyacrylates, polymethacrylates and organic cellulose esters, and polyamides, polyurethanes, polyureas, polyimides, polyesters, polyethers, polystyrenes, polyhydantoins, polyphenylene oxides, polyphenylene sulphides, polysulphones, polycarbonates, phenol resin precursors, furan resin precursors, melamine resin precursors, epoxy resin precursors, compounds having double bonds which are capable of forming polymers and/or polyaddition products, polyimide precursors, polyether ketones, polyetherether ketones, polyethersulphones, polyetherimides, polyamide-imides, polyfluoroalkenes, polyester carbonates, and liquid crystal polymers; and, in addition, non-polar thermoplastic polymers (for example polyolefins) to which polar groups have been grafted.

Preferred thermoplastics are polyethylenes, polypropylenes, polybutylenes, polypentenes, polyvinylchlorides, polymethylmethacrylates, polyacrylonitriles, polymethacrylonitriles, multiple-phase plastics containing polystyrene, such as ABS, polyamides-6, polyamides 6-6, polyurethanes, polyethylene terephthalates, polybutylene terephthalates, bisphenol-A polycarbonates, polyphenylene sulphides, polyether ketones, polyetherether ketones, polyethersulphones, polysulphones, polyetherimides, polyamide-imides, polyester carbonates, liquid crystal polymers and polypropylene to which polar groups have been grafted.

The thermoplastics can also be present in the widest variety of combinations, for example as copolymers, block polymers, graft polymers, mixed polymers and polymer blends.

The chemical constitution of the reinforcing fibres and of the thermoplastic can also be of the same type, for example they can both consist of polyester. However, it is also essential in this case that the material from which the reinforcing fibres are made has a higher softening interval or melting point than the material from which the thermoplastic matrix is made.

According to the process, resin systems which are subjected to cross-linking in a further step following impregnation, such as duroplast systems, or elastomer systems, can also be processed. In such cases the use of pressure is advantageous because improved impregnation or higher production rates and longer pot lives are achieved, because processing at higher viscosities is possible. The word "thermoplastic" should then appropriately be replaced in the present text by the word "curable resin systems."

In accordance with the invention, very brittle fibres, for example high modulus carbon fibres can also be used, because the fibres are not bent or deflected due to the absence of inserts.

The chemical constitution of the reinforcing fibres can be of the most diverse kind. The only essential requirement is that the reinforcing fibres have a higher softening point or melting point than the particular thermoplastic matrix which is present. Examples of fibre materials are inorganic materials, such as silicate and non-silicate glasses of the most diverse kinds, carbon, boron, silicon carbide, metals, metal alloys, metal oxides, metal nitrides, metal carbides and silicates, as well as organic materials such as natural and synthetic polymers, for example polyacrylonitriles, polyesters, ultra-highly oriented polyolefin fibres, polyamides, polyimides, aramides, liquid crystal polymers, polyphenylene sulphides, polyether ketones, polyetherether ketones, polyetherimides, cotton and cellulose. Materials melting at high temperature, for example glasses, carbon, aramides, liquid crystal polymers, polyphenylene sulphides, polyether ketones, polyetherether ketones and polyetherimides are preferred.

The reinforcing fibres can be distributed evenly in the light composite material of the invention, however, they can also be present in a greater proportion in certain parts of the material, for example in the edge regions and/or special reinforcement zones, than in other parts of the material.

In accordance with the invention, in addition to rovings of the reinforcing fibres, other linear moulded bodies, such as fibres, yarns, threads, ropes and textile structures, such as woven and knitted fabrics can also be processed into composite materials with good mechanical properties.

Due to the low take-off of the invention, it is also possible to process textile structures which can be stretched in the direction of pull, for example knitted fabrics and braids.

The content of reinforcing fibre in the final product is generally between 20 and 85 volume %, preferably 40–70 volume %, and for profiles with purely unidirectional reinforcement, 30 to 90 volume %, preferably 40–80 volume %.

A further advantage of the process of the invention lies in the possibility of shaping the profile in the shaping nozzle in a manner which does not harm the fibres. That is to say, the nozzle can be shaped in such a manner that it seals the pressure chamber directly from the exterior so that the pressure difference between the melt bath and the surroundings is reduced along the length of the nozzle. As a result, molten polymer is forced between the surface of the tape and the nozzle and thus surface friction of the reinforcing fibre filaments at the nozzle is avoided or at least considerably reduced.

The geometric shape and the dimensions of the nozzle can be varied within wide limits so that composite material profiles or tapes having different shapes and dimensions can be manufactured. Round profiles having diameters up to 30 mm, preferably 18 mm, and rectangular profiles having widths up to 2500 mm and having thicknesses up to 10 mm, are preferred. Thin tapes having thicknesses up to 1 mm are particularly preferred.

The reinforcing fibre structure can be introduced into the melt chamber in different ways. For example, it can be drawn through a nozzle having narrow clearance. The fibre structure is preferably introduced into the melt chamber through a gap without touching the wall. The pressure difference is overcome by the convective flow or drag flow which arises as a result of the adhesion of the polymer to the moving tape.

FIG. 1 shows a gap (3) of this type between the moving tape (1) and the solid wall (2). As a result of the adhesion, the polymer on the surface of the tape (1) has the same speed as the tape itself. Convective flow or drag flow in the direction of movement of the tape (5) occurs near the tape, and flow in the opposite direction (leakage flow) (6) occurs near the wall as a result of the principle of continuity. If polymer is neither introduced nor removed from the high pressure chamber, the amounts flowing in both directions must be exactly the same.

The separation between the high and low pressure chambers is not a seal in the real sense. Rather, the flow in the gap determines the pressure in the actual high pressure chamber. The pressure difference which forms depends on the geometric dimensions (gap width, tape thickness, gap length) and on the viscosity of the medium, the tape speed and any overlapping total amount of flow. A computer program which is based on the corresponding equations of laminar flow permits the calculation of the particular pressure difference.

A particular advantage of the arrangement is a rise in the pressure and consequently a rise in the quality of impregnation with increasing tape speed and increasing viscosity, that is, in such cases where impregnation becomes more difficult. One free parameter for adjusting the pressure is the use of an excess amount of polymer which is introduced into the high pressure chamber, for example by means of an extruder or a pump, and which flows through the gap (3) in the opposite direction (6).

Figure 2:
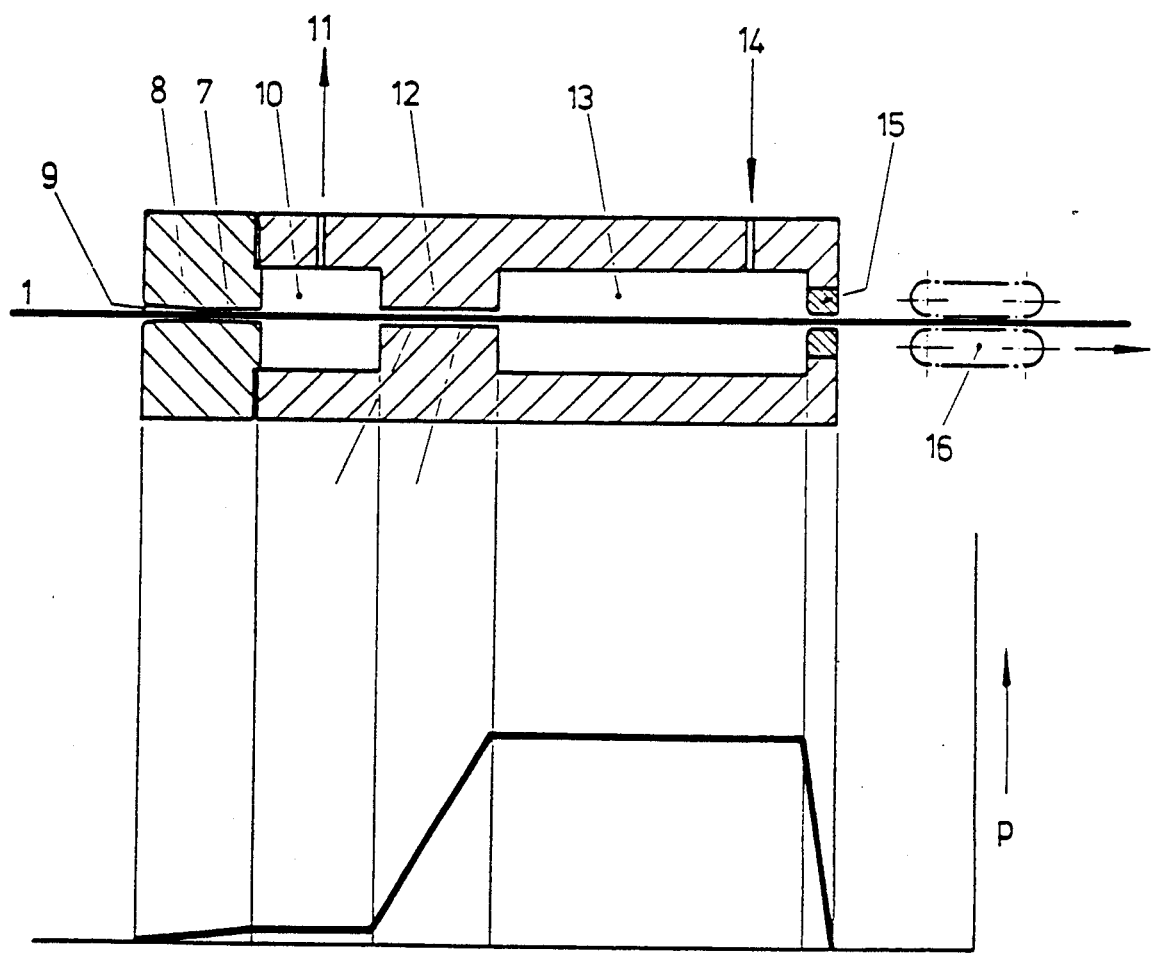
FIG. 2 in the upper portion shows a device for coating a moving tape with thermoplastic plastic wherein a moving tape is initially introduced into a melt chamber and then into a high pressure chamber according to the invention. In the lower portion

FIG. 2 shows a preferred embodiment for carrying out the process of the invention using the high pressure chamber (13), the sealing gap (12) and the shaping nozzle (15) and the take-off device (16) which draws the reinforcing fibre structure (1) through the whole unit. This structure (1) initially passes through a chamber (10) completely filled with melt, which chamber (10) is under atmospheric pressure or a slight excess pressure of at most 0.5 bar. Duct (11) provides for air removal and removal of any excess amount of polymer which may have been used. The inlet nozzle (7/8) preferably comprises a cylindrical part (7) with low clearance between fibre tape (1) and the wall, and a conical part (8). Where there is slight excess pressure in chamber (10), the nozzle is at least partly filled with polymer melt so that the air surrounding the roving is squeezed out.

FIG. 2 also indicates schematically the pressure profile along the technical device described.

The fibre tape is then drawn into the high pressure chamber (13) through the gap (12) described in FIG. 1. The actual impregnation of the fibre structure with the thermoplastic takes place in (12/13). Then, the shaping nozzle (15) gives the profile its final external shape. As a rule, a slight polymer excess, which can be recycled, is used to control the concentration of dissolved air in the high pressure chamber (13). The amounts of polymer added, as a rule with the aid of an extruder or a pump, for example a gear pump, preferably through duct (14), are less than five times, preferably twice the amount of polymer leaving with the finished composite material. The excess is passed through the sealing gap (12) and removed via the overflow (11) where the slight excess pressure in the chamber (10) is adjusted by throttling.

The distance of the tape from the wall in the high pressure chamber (13) can be such that there is no further noticeable increase in pressure in the take-off direction. If low polymer residence times are required for sensitive polymers, it is, however recommendable for the reinforcing fibre tape to be conveyed near the walls. This can lead to a further calculable increase in pressure over the length of the high pressure chamber. If necessary, the sealing gap (12) and high pressure chamber (13) may have the same gap width. In such cases, the pressure between the chamber (10) and the shaping nozzle (15) increases linearly (providing isothermal conditions are present).

The shape of the cross-section of the sealing gap (12) depends on the geometry of the product. It is preferably shaped so that uniform sealing gap forms between the reinforcing fibre structure and the wall. However, asymmetries between the fibre tape and the gap may also be advantageous, for example when broken fibres or dirt particles are to be removed with the leakage flow (6) via duct (11). For this purpose, special channels can also be provided on one side or both sides of the tape. For example, the use of a cylindrical bore may be advantageous for narrow tapes.

Figure 3:
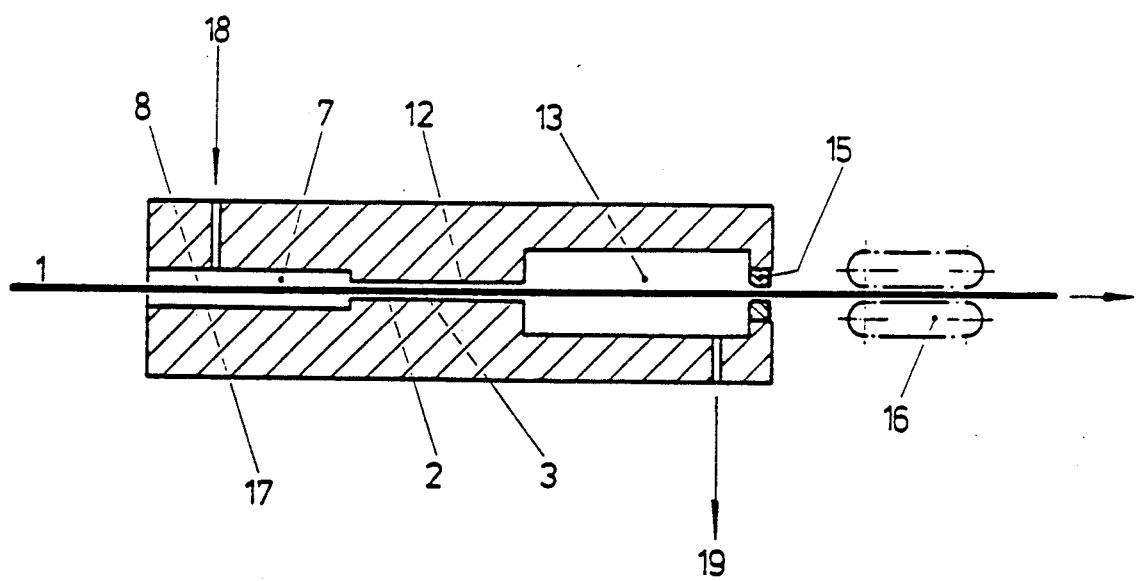
FIG. 3 shows another device according to the invention for coating a moving tape with thermoplastic plastic.

FIG. 3 shows a further preferred device for carrying out the process of the invention. Here, the thermoplastic melt is introduced at point (18) and conveyed concurrently with the tape. The inlet channel (17) may have the same gap width as the sealing gap (12). However, it may also be wider. In order to obtain prior distribution of the melt in the reinforcing fibre structure, the channel (17) can also be corrugated, or can contain inserts, for example in the form of cylinders or cylinder sections. As the reinforcing fibre structure (1) already passes through at a width which corresponds to the product, these inserts do not have a width-retaining effect.

The thermoplastic melt is metered by means of accurately working metering devices, for example spinning pumps, in such a way that the excess amounts remain small. Excesses are preferably removed via the inlet nozzle (7/8), but they can also be removed from the high pressure chamber with the aid of an over pressure valve via duct (19).

The addition of melt through the schematically illustrated ducts (14) or (18) can be carried out in such a manner that the melt is added at the periphery in a rotationally symmetric fashion. A preferred embodiment is a nozzle fed by an extruder, through which nozzle the fibre tape passes either centrally or—for example when using rovings—through an annular gap on the periphery.

All the devices according to FIG. 2 and FIG. 3 are kept at the desired processing temperature by means of heating. Division into at least four independent heating zones which comprise the inlet nozzle (7/8) and the chamber (10), the gap (12), the high pressure chamber (13) and the shaping nozzle (15), is preferred in this case.

The temperature at which the sealing gap (12) is kept is of particular importance for the process. As a rule, the attempt will be made to keep the temperature in the high pressure chamber (13) as high as possible so that the viscosity for the impregnation of the reinforcing fibre structure remains as low as possible. However, since the pressure difference produced along the sealing gap is proportional to the viscosity of the thermoplastic, a temperature which is as near as possible to the melt temperature of the thermoplastic is advantageous.

It is also important to have an independent means of adjusting the temperature of the shaping nozzle (15), it also being possible for there to be a division into different heating zones. By keeping the nozzle exit temperature low, and preferably below the melt temperature of the thermoplastic, it is possible to produce a well-shaped strand under conditions which do not harm the fibres. When the strand has left the shaping nozzle, it can be after-treated, for example by cooling using a temperature program or by smoothing in a rolling mill.

A further important method of reducing the viscosity during impregnation of the fibre structure is to introduce high shearing stresses in the sealing gap 3, as a result of which the viscosity is reduced for intrinsically viscous materials. As can be seen from FIG. 1, the highest shearing stress and hence the highest viscosity reduction occurs exactly at point 4 of the surface of the tape, at which the polymer is intended to penetrate the tape.

A viscosity reduction of this type as a function of the shear rate is a basic property of molten polymers. The process is particularly advantageous if the impregnation is carried out using polymers in which the viscosity is highly dependent on the shear rate, for example liquid crystal polymers or acrylonitrilebutadiene-styrene polymers (ABS).

When impregnating one or more reinforcing fibre rovings, the rovings (1) are preferably made into a flat wide tape before entering the inlet nozzle (8/9); this facilitates impregnation.

Pretreatment of the roving to separate the filaments, for example by mechanical break-up of the size, thermal treatment or application of ultrasound, is preferably carried out at the same time.

For all reinforcing fibre structures to be used, preheating before entering the inlet nozzle (8/9) proves to be advantageous. In addition, a definite product tension must be set before entrance into the inlet nozzle, and this can take place preferably when flattening the above-mentioned wide tape when using rovings, or, for example, directly during take-off from the supply rolls when using textiles.

Thus, no pins are required to keep the reinforcing fibre structure flat in the impregnating unit itself. When impregnating rovings, the width of the tape passing into the sealing gap (8/9) can exceed the width of the shaping nozzle (15), or can be the same as the width of the nozzle.

An arrangement of additional impregnation aids which help the reinforcing fibre structure to glide over the polymer film in the process of being formed, can be advantageous, in particular for highly viscous thermoplastics, to assist the impregnation. Impregnation aids of this type which, for example, completely or partly comprise cylinders having circular or elliptical bases, have no function as regards keeping the tape flat and are only required at viscosities above 30 Pas, where other impregnating devices fail for the reasons mentioned.

EXAMPLE 1

Flow profile and pressure build-up in the sealing gap 3 can be calculated with the aid of various simplifying assumed parameters (such as Newtonian flow without friction).

For a unidirectionally reinforced circular profile having the diameter d which runs at the rate w in a circular channel having the diameter D, the following pressure increases $\Delta p$ in bar/cm gap width result in a medium having a viscosity $\eta$ at an additional back-flow rate V in litres/hour:

| d = 1.86 mm; D = 4 mm; V = 0.5 liters/hour | | |
| --- | --- | --- |
| Pas | w meters/minute | p bar/cm |
| 10 | 5 | 0.4 |
| 100 | 5 | 3.6 |
| 400 | 5 | 14.5 |
| 700 | 5 | 25.4 |
| 700 | 10 | 50.8 |
| 700 | 20 | 101.7 |

| d = 1.86 mm; = 100 Pas; w = 10 meters/minute | | |
| --- | --- | --- |
| D mm | V liters/hour | p bar/cm |
| 3 | 0.5 | 32.0 |
| 4 | 0.5 | 7.3 |
| 5 | 0.5 | 2.7 |
| 4 | 1.0 | 8.8 |
| 4 | 0.0 | 5.8 |

The considerable influence of the virtually freely selectable gap width can be seen.

EXAMPLE 2

For a tape having rectangular cross-section which passes centrally through a gap of the same cross-sectional shape, the distance s between the tape and the gap is the characterizing parameter. Disregarding the edge zones, the results for the pressure increase are:

| $\eta$ = 30 Pas; w = meters/minute | | |
| --- | --- | --- |
| s mm | V liters/hour | p bar/cm |
| 0.125 | 0.01 | 731 |
|  | 0.05 | 814 |
|  | 0.1 | 918 |
|  | 0.25 | 1230 |
|  | 0.5 | 1750 |
| 0.2 | 0.01 | 155 |
|  | 0.05 | 163 |
|  | 0.1 | 174 |
|  | 0.25 | 205 |
|  | 0.5 | 257 |
| 0.25 | 0.01 | 84 |
|  | 0.05 | 87 |
|  | 0.1 | 91 |
|  | 0.25 | 104 |
|  | 0.5 | 125 |

The high adjustability of $\Delta p$ over the gap width and the amount of leakage flow can be seen.

EXAMPLE 3

The calculation of the shear rate $\gamma$ at the surface of the transported tape 1 is possible where the flow profile is known (assumed parameter, see Example 1). Thus, high shear rates can be adjusted, which leads to a reduction in the viscosity at the surface of the tape and thus to an improved penetration of the reinforcing fibre structure in very intrinsically viscous plastics (such as thermotropic liquid crystal polymers).

| s mm | V liters/hour | w meters/minute | $\gamma$ 1/second |
| --- | --- | --- | --- |
| 0.125 | 0.01 | 10 | 10 450 |
|  | 0.1 | 10 | 12 470 |
|  | 0.5 | 10 | 21 450 |
|  | 0.5 | 20 | 31 680 |
| 0.2 | 0.01 | 10 | 4 800 |
|  | 0.1 | 10 | 5 230 |
|  | 0.5 | 10 | 7 170 |
|  | 0.5 | 20 | 11 920 |
| 0.25 | 0.01 | 10 | 3 520 |
|  | 0.1 | 10 | 3 760 |
|  | 0.5 | 10 | 4 810 |
|  | 0.5 | 20 | 8 310 |

EXAMPLE 4

A composite material profile is manufactured by impregnating a glass fibre roving 2400 tex (filament diameter 10 μm) with polyamide 6 (Bayer $^R$ Durethan B 30 S). The impregnating temperature is 290° C. The viscosity at this temperature is 135 Pas (shear rate $\gamma = 10/s$).

The glass fibre roving is drawn in the form of a flat tape of 17.5 mm width at a rate of w=10 metres/minute through a gap having a gap width of 1 mm and a breadth of 18 mm. The glass fibre tape has a thickness of approximately 120 μm so that a dimension of approximately 0.44 mm results for the distance between the fibre tape and the wall. The gap length is 100 mm, the amount of back flow V=0.5 litres/hour.

A computed pressure increase of Δp=186 bar results using the assumed parameters of Example 1. A value of Δp=150 bar is measured with the aid of a pressure sensor.

The gap region is cooled to a temperature of approximately 240° C. with the aid of air cooling, whereas the actual high pressure impregnating section remains at 290° C. The pressure then rises considerably; a value of Δp=330 bar is measured.

EXAMPLE 5

A flat composite material is manufactured by drawing a carbon fibre tape having 24 000 fibres with a filament diameter of 7 μm corresponding to 1600 tex through a melt of polyphenylene sulphide (Bayer $^R$Tedur). The type used has a melt viscosity of 25 Pas at the impregnating temperature of 320° C.

The tape of a width of 17.5 mm is drawn through a gap having a width of 0.5 mm and a breadth of 18 mm at a rate of w=10 metre/minute. A dimension of approximately 0.19 mm is measured for the distance between carbon fibre tape and wall. The gap length is 100 mm, the amount of back flow V=0.5 litres/hour. A compute pressure increase of p=156 bar results using the assumed parameters of Example 1. The measured value is Δp=150 bar.

EXAMPLE 6

A flat composite material is manufactured by drawing a carbon fibre tape (C fibre from Example 5) through a melt of thermotropic liquid crystal polymer (Bayer test product KU 1-9231). At 350° C. the viscosity of the intrinsically viscous melt has the value $\eta=530$ Pas at a shear rate of $\eta=10/s$, and the value $\eta=90$ Pas at $\eta=1000/s$.

The tape of a width of 17.5 mm is drawn through a gap of 1 mm gap width and 18 mm breadth at a rate of w=10 metres/minute. The gap length is 100 m, the amount of back flow V=0.5 litres/hour.

A pressure increase of p=185 bar is measured. A shear rate of $\gamma=870/s$ is computed at the tape surface, and thus a viscosity reduction of 17.7% of the value at $\gamma=10/s$. The impregnating quality is thus considerably improved.

We claim

1. A process for the manufacture of continuous moulded bodies from structures of reinforcing fibres impregnated with thermoplastics, comprising the steps of:
   (a) introducing the structure into a pressure chamber; and
   (b) impregnating the structure with thermoplastic in the pressure chamber at a pressure of 1 to 800 bar for a length of at least 300 mm.

2. The process according to claim 1 wherein the structures impregnated with thermoplastics are tapes, thin flat structures or profiles of composite materials made from thermoplastics and reinforcing fibres.

3. The process according to claim 1, wherein the structures of reinforcing fibres are rovings, yarns, threads, ropes or textile structures (woven fabrics or knitted fabrics).

4. The process according to claim 1, wherein the structures of reinforcing fibres are textiles with unidirectional, orthotropic or multiaxial alignment of the reinforcing fibres which are held together by means of thermoplastic binding filaments.

5. The process according to claim 1 wherein the thermoplastic has a melt viscosity below 500 Pas at the processing temperature.

6. The process according to claim 1 further comprising the step of:
   (c) passing the impregnated structure through a shaping nozzle.

7. A process for the manufacture of continuous moulded bodies from structures of reinforcing fibres impregnated with thermoplastics comprising the steps of:
   (a) introducing the structure into a melt chamber;
   (b) drawing the structure from the melt chamber through a gap into a pressure chamber; and
   (c) impregnating the structure with thermoplastic in the pressure chamber at a pressure of 1 to 800 bar for a length of at least 300 mm.

8. The process according to claim 7 wherein for impregnation of thermoplastics requiring low residence times in step (c) the structure is conveyed near the walls of the pressure chamber, while avoiding contact therewith, producing a calculable pressure increase along the length of the pressure chamber.

9. The process according to claim 7 further comprising the step of
   (d) passing the impregnated structure through a shaping nozzle.

10. An apparatus for manufacturing continuous moulded bodies from structures of reinforcing fibres impregnated with thermoplastics comprising
    a housing defining a pressure chamber into which a thermoplastic melt is introduced, the pressure chamber having a length of at least 300 mm and having at one end of this length an inlet and at an opposite end an outlet, the pressure chamber being maintained at an interior pressure in the range of from 1 to 800 bar;
    a shaping nozzle at the outlet of the pressure chamber; and
    a gap between solid walls of the housing at the inlet of the pressure chamber that is sealed by drag flow of the thermoplastic melt
such that the structure of reinforcing fibres may be introduced into the pressure chamber through the gap at the inlet and impregnated with the thermoplastic melt over the length of the pressure chamber and exit the pressure chamber through the shaping nozzle at the outlet.

* * * * *